UNITED STATES PATENT OFFICE.

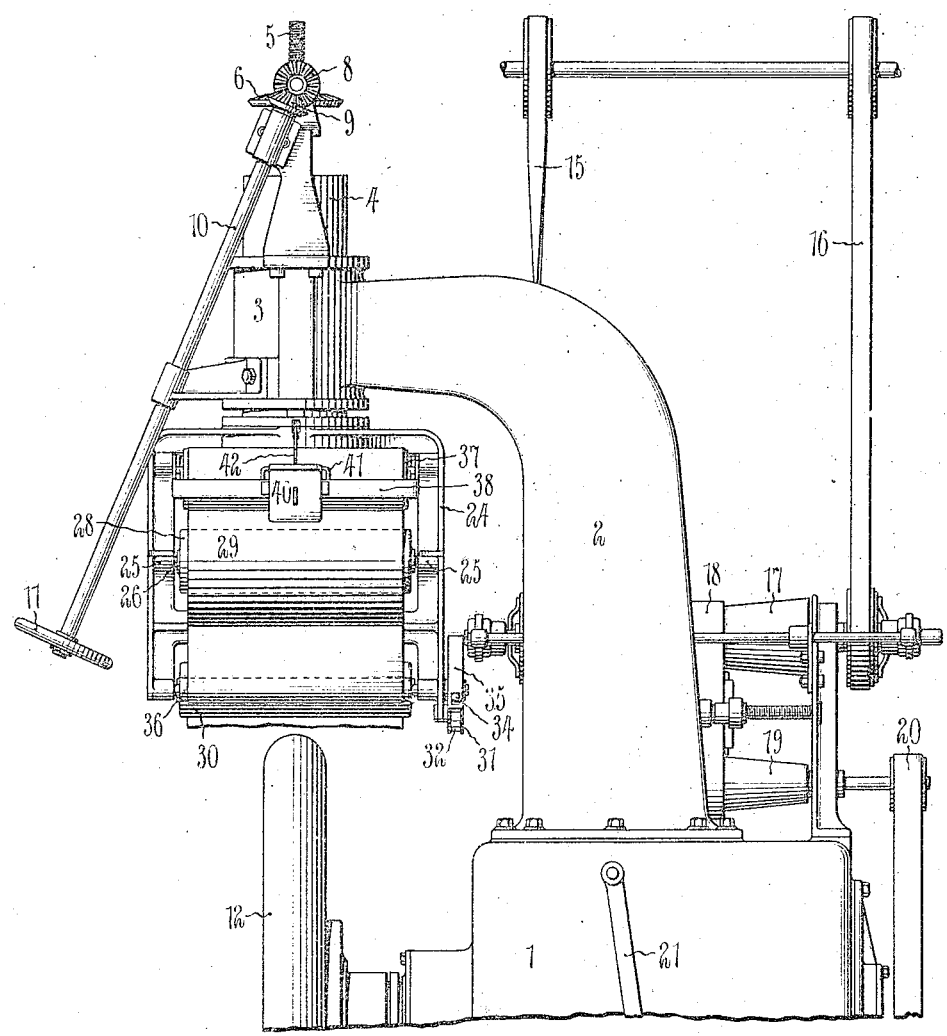

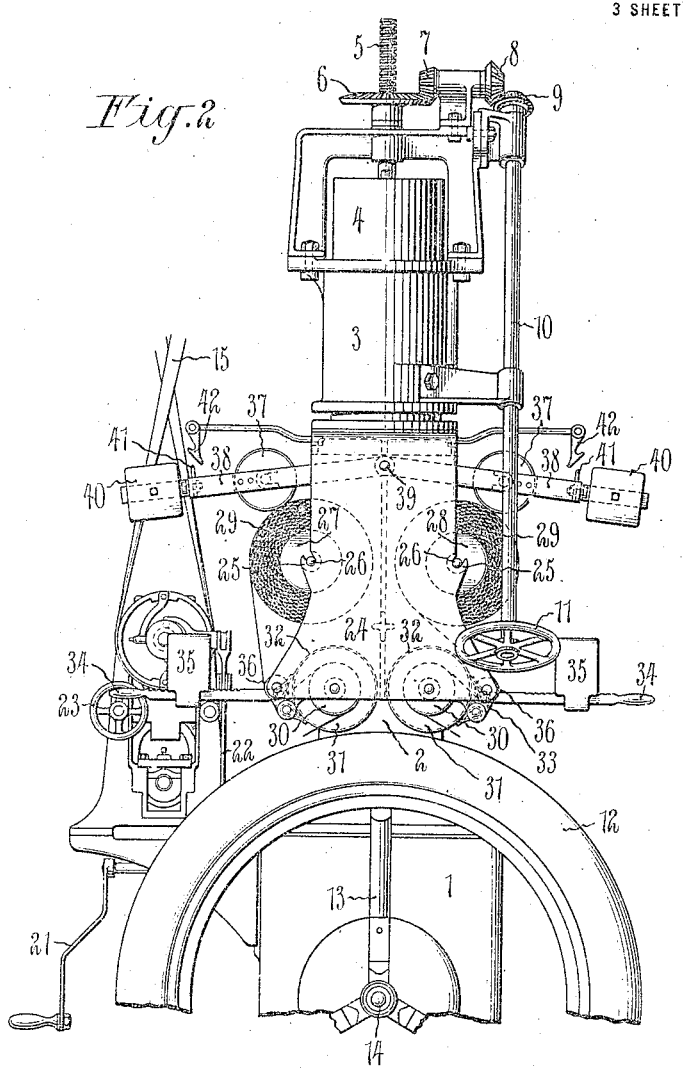

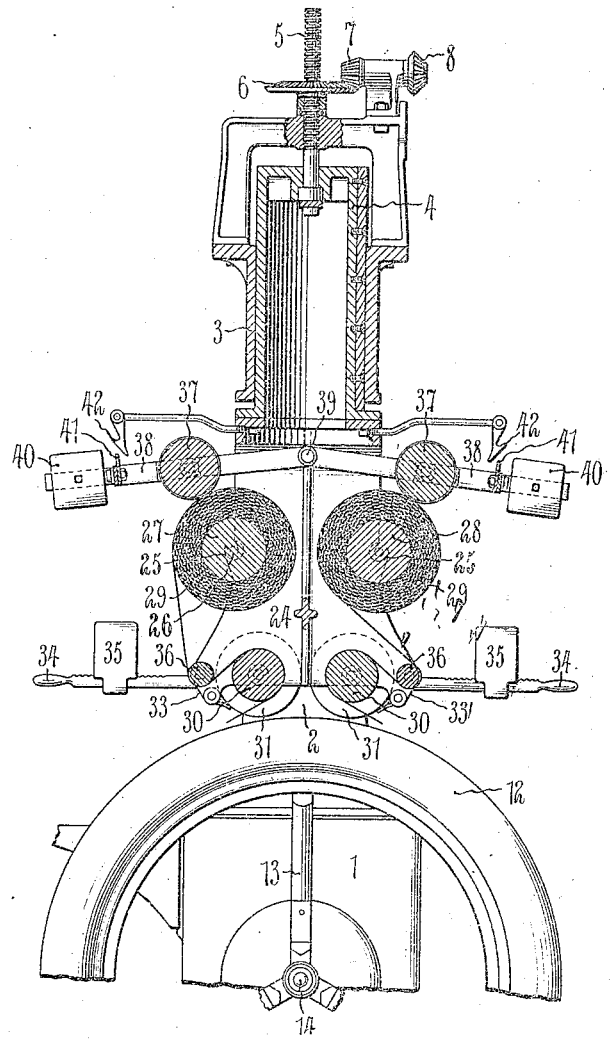

PETER D. THROPP AND JOHN E. THROPP, OF TRENTON, AND ALBERT DE LASKI, OF WEEHAWKEN, NEW JERSEY, ASSIGNORS TO THE DE LASKI AND THROPP CIRCULAR WOVEN TIRE COMPANY, OF TRENTON, NEW JERSEY, A CORPORATION OF NEW JERSEY.

TIRE-MAKING MACHINE.

1,178,974.  Specification of Letters Patent.  Patented Apr. 11, 1916.

Application filed June 29, 1912. Serial No. 706,679.

*To all whom it may concern:*

Be it known that we, PETER D. THROPP, JOHN E. THROPP, and ALBERT DE LASKI, citizens of the United States; said PETER D. THROPP and JOHN E. THROPP being residents of Trenton, in the county of Mercer and State of New Jeresy, and said ALBERT DE LASKI being a resident of Weehawken, in the county of Hudson and State of New Jersey, have invented new and useful Improvements in Tire-Making Machines, of which the following is a specification.

This invention relates to tire making machinery with the object in view of providing an attachment for such machinery which will enable tires, and particularly tire shoes or casings, to be manufactured much more speedily than has been heretofore possible.

The apparatus which is the subject matter of this invention is particularly adapted for use in connection with the tire making machine shown in our application Serial No. 673069, filed January 24, 1912, which matured into Patent No. 1,119,326, issued Dec. 1, 1914.

A practical embodiment of the invention is represented in the accompanying drawings, in which—

Figure 1 represents a detail side view of a tire making machine such as that shown in our application above referred to with our present invention in place therein, Fig. 2 represents a detail front view of the parts shown in Fig. 1, and Fig. 3 represents a similar view partly in section.

The casing of the machine is denoted by 1, and the overhanging stanchion, secured thereon, by 2, which stanchion is provided with a hollow head 3 fitted to receive a cylinder 4 arranged to be reciprocated within the head 3 by a screw 5 connected by miter gears 6, 7, 8 and 9 with a rod 10 provided at its lower end with a hand wheel 11 for manual operation thereof.

A core or mandrel 12 is supported by a spider 13 mounted on a shaft 14 journaled horizontally in the casing 1, which core 12 is adapted to be driven at varying speeds in both directions by means of belts 15 and 16 connecting a source of power, not shown, with a steady speed cone 17 which, in turn, drives, by means of a belt 18, a variable speed cone 19, from which cone 19 a belt 20 runs to drive trains of gearing located within the casing 1, but not shown herein, which gearing is adapted to be thrown into low speed, high speed or neutral by levers 21; while the direction of rotation of the steady speed cone 17 is controlled by a lever 22, and the speed of rotation of the variable speed cone 19 controlled by a hand wheel 23.

All the parts above referred to are clearly shown and described in our pending application heretofore mentioned, and will not be further described herein as their specific form and arrangement constitutes no part of the present invention.

A frame 24 of inverted U-shape is secured to the reciprocating cylinder 4 and hence arranged to be moved with the latter toward and away from the core or mandrel 12. This frame 24 is provided in each side with a pair of open journals 25 fitted to receive the spindles 26 of the stock rolls 27, 28, which are supplied with the well known friction fabric or duck 29 used in the construction of the so-called carcass of the tires. One of the said rolls is provided with the friction fabric of the proper width for incorporation in the tire under the well known bead cores, and the other stock roll is provided with friction fabric of the proper width for being placed in the tire over the bead cores. It will be understood that the fabric which goes under the bead cores and that which goes over the bead cores in a tire of given size not only vary in width between themselves, but that the fabrics for these two positions also vary in width for different sizes of tires. Below the said stock rolls 27, 28, and in the frame 24, are rotatably mounted a pair of large guide rolls 30, which rolls are composed of wood or provided in some other convenient way with a friction surface; while each of said guide rolls 30 has at one end a brake drum 31 adapted to be engaged by constricting bands 32, which bands are operated through toggle joints 33 by levers 34 having adjustable weights 35 thereon.

A pair of small guide rolls 36, are also rotatably mounted in the frame 24 at a slight lateral distance from the guide roll 30. These small guide rolls 36 may be composed of iron or steel and are not provided with a friction surface or with brakes for restricting their free rotary movement.

The friction fabric or duck is arranged to be led from the stock rolls 27, 28, first around the small guide rolls 36 and thence around the large friction guide rolls 30 to the core or mandrel 12. This course of the fabric is clearly shown in Figs. 2 and 3.

It will be noted that the fabric is led from the inside of the stock roll 28 and from the outside of the stock roll 27, hence the rotary feeding movement of the two rolls 27 and 28 is in the same direction.

A pair of take-up rolls 37 are mounted in swinging arms 38 pivoted at 39 in the frame 24, which rolls 37 are adapted to frictionally engage the fabric 29 on the stock rolls 27, 28, and be rotated by said frictional contact to take up the muslin or other cloth with which the friction fabric is commonly associated on the stock rolls. The arms 38 are provided with adjustable weights 40 for varying the frictional engagement of the take-up rolls 37 with the material 29 on the stock rolls 27, 28. The said arms are also provided with loops 41, adapted to engage hooks 42 for holding the take-up rolls 37 out of engagement with the material 29 on the stock rolls 27, 28, when desired.

In operation, the friction fabric or duck is placed upon the stock rolls 27, 28, with the ends of the strips stuck or spliced together and with the threads of the said fabric at the same angles on both stock rolls. The fabric may then be led from the stock roll which has the narrower fabric thereon and its free end stuck, in the customary manner, on the periphery of the core 12. The core is then rotated in the appropriate direction and the said rotation continued until the number of layers or plies of the fabric have been superimposed upon the said core or mandrel which are desired to be incorporated in the tire before the placing of the well known beads or bead cores. The rotation of the core 12 is then stopped and the friction fabric from the stock roll severed at the proper point. The plies of fabric thus placed on the core may be formed thereon by the mechanism shown in our pending application already referred to or in any other desired manner; and the bead cores then placed in proper position by mechanism shown in the said application or in any other desired manner; the particular method of forming the fabric about the core or placing the bead cores forming no part of the present invention. After this stage is reached, the wider fabric is led from the other stock roll and its free end stuck to the fabric already superimposed on the core 12, and the core is then rotated in the reverse direction, this rotation being continued until the proper number of layers of the wider fabric have been placed upon the partially formed tire on the core. At this juncture, the rotation of the core 12 is stopped and the fabric severed at the proper place; after which it may be formed down over the bead cores by mechanism shown in our said application or in any other desired manner and the construction of the tire completed; the particular manner of forming this fabric down over the bead cores and completing the tire forming no part of our present invention.

It will be understood that the plies of fabric which were laid under the bead core have their threads at the same angles, and that the plies of fabric which were laid over the bead cores also have their threads at the same angles; but that, owing to the fact that the fabric on both stock rolls have their threads at the same angles and that the direction of rotation of the core 12 was different when laying the fabric under the bead core from its direction when laying the fabric over the bead cores, the plies which are under the bead core in the tire have their threads at different angles from the plies which are over the bead cores. It will also be seen that by this method of manufacturing tires we are enabled to lay the plies of fabric which form the carcass of the tire very much more rapidly than heretofore, because it has previously been the custom to lay the alternating plies of fabric throughout with their threads at different angles. Furthermore, the mechanism which I have shown herein is very well adapted for carrying out this method, and cooperates particularly well with the tire making machine shown in our aforesaid application. Again, the tire made in this manner, with its threads lying at one angle under the bead core and at another angle over the bead core, we have found to be extremely strong and durable.

It will be understood that various changes may be resorted to in the form, construction and arrangement of the several parts, and in the character of material used and its method of application, without departing from the spirit and scope of our invention; hence we do not wish to limit ourselves strictly to the form or method herein shown and described, but

What we claim is:—

1. Apparatus of the character described comprising a core upon which the tire may be built, a stanchion, a plurality of rolls mounted in the stanchion and adapted to hold friction fabric, means for feeding the said fabric from the rolls to the core, and means for rotating the core in one direction for drawing fabric from certain of the rolls and in the reverse direction for drawing fabric from another of the rolls.

2. Apparatus of the character described comprising a core upon which the tire may be built, a stanchion, a pair of rolls mounted in the stanchion and adapted to hold friction fabric, means for feeding the said fabric from the rolls to the core, and means for rotating the core in one direction for drawing fabric from one of the rolls and in the reverse direction for drawing fabric from the other roll.

3. Apparatus of the character described comprising a core upon which the tire may be built, a stanchion, a pair of rolls mounted in the stanchion and adapted to hold friction fabric, the threads of the said fabric on both rolls lying at the same angle, means for feeding the friction fabric from the rolls to the core, and means for rotating the core in one direction for drawing fabric from one roll and in the reverse direction for drawing fabric from the other roll, whereby the fabric which is drawn from one roll will lie upon the core with its threads at one angle and the fabric which is drawn from the other roll will lie upon the core with its threads at opposite angles to the threads of the first-named fabric.

4. Apparatus of the character described comprising a core upon which the tire may be built, a pair of stock rolls at the same side of the core adapted to hold friction fabric, the threads of the said fabric on both rolls lying at the same angle, means for feeding the friction fabric from the rolls to the core, and means for rotating the core in one direction for drawing fabric from one roll and in the reverse direction for drawing fabric from the other roll, whereby the fabric which is drawn from one roll will lie upon the core with its threads at one angle and the fabric which is drawn from the other roll will lie upon the core with its threads at opposite angles to the threads of the first-named fabric.

In testimony, that we claim the foregoing as our invention, we have signed our names in presence of two witnesses, this twenty-seventh day of June, 1912.

PETER D. THROPP.
JOHN E. THROPP.
ALBERT DE LASKI.

Witnesses:
CLIFFORD W. LEE,
HARRY P. MESSLOR.